US012749722B2

(12) United States Patent
Kim

(10) Patent No.: US 12,749,722 B2
(45) Date of Patent: Sep. 29, 2026

(54) BATTERY PROTECTION METHODS AND SYSTEMS

(71) Applicant: LG ENERGY SOLUTION, LTD., Seoul (KR)

(72) Inventor: Jae Hyung Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 777 days.

(21) Appl. No.: 18/034,307

(22) PCT Filed: Aug. 26, 2022

(86) PCT No.: PCT/KR2022/012788
§ 371 (c)(1),
(2) Date: Apr. 27, 2023

(87) PCT Pub. No.: WO2023/054907
PCT Pub. Date: Apr. 6, 2023

(65) Prior Publication Data

US 2023/0402661 A1 Dec. 14, 2023

(30) Foreign Application Priority Data

Sep. 30, 2021 (KR) ........................ 10-2021-0130200
Jul. 28, 2022 (KR) ........................ 10-2022-0093894

(51) Int. Cl.
*H01M 10/42* (2006.01)

(52) U.S. Cl.
CPC .. *H01M 10/425* (2013.01); *H01M 2010/4271* (2013.01); *H01M 2010/4278* (2013.01)

(58) Field of Classification Search
CPC ....... H01M 10/425; H01M 2010/4271; H01M 2010/4278; H01M 10/44; H01M 10/42;
(Continued)

(56) References Cited

U.S. PATENT DOCUMENTS 5,327,068 A * 7/1994 Lendrum .................. H02J 7/14 320/136
6,646,845 B1 * 11/2003 Turner .................... H02J 9/002 320/148
(Continued)

FOREIGN PATENT DOCUMENTS

EP 1122853 A2 * 8/2001 ................ H02J 7/62
JP 2008-206250 A 9/2008
(Continued)

OTHER PUBLICATIONS

International Search Report (PCT/ISA/210) issued in PCT/KR2022/012788 mailed on Dec. 1, 2022.
(Continued)

*Primary Examiner* — M Baye Diao
(74) *Attorney, Agent, or Firm* — Birch, Stewart, Kolasch & Birch, LLP

(57) ABSTRACT

The present invention relates to a battery protection method and system, and relates to a method of classifying protection operations based on the possibility of occurrence of safety issues such as ignition/heating, and additionally implementing protection algorithms corresponding to each while maintaining the existing protection operation/release condition, and relates to a method and system for protecting a battery in a way to prevent safety issues in advance by permanently blocking battery operation if the over voltage of the battery bank continues to occur even after the first action before reaching the cell unbalance protection operation condition, check whether an over voltage occurs in a specific battery bank, and take the primary measures to prevent overcharge of the battery bank.

24 Claims, 4 Drawing Sheets

(58) Field of Classification Search
CPC .... H01M 10/48; H02J 7/60; H02J 7/64; H02J 7/663; H02J 7/80; H02J 7/61; H02J 7/63; Y02E 60/10
USPC .......................................................... 320/134
See application file for complete search history.

(56) References Cited

U.S. PATENT DOCUMENTS

| | | | | |
|---|---|---|---|---|
| 6,804,100 | B2 | 10/2004 | Astala | |
| 7,397,221 | B2 * | 7/2008 | Sakuma | H02J 7/61 320/152 |
| 7,973,534 | B2 * | 7/2011 | Tatebayashi | H02J 7/54 320/128 |
| 8,552,689 | B2 * | 10/2013 | Wang | H01M 10/44 320/134 |
| 8,558,509 | B2 * | 10/2013 | He | H02J 7/663 320/134 |
| 9,577,443 | B2 * | 2/2017 | Gach | G01R 31/36 |
| 10,948,544 | B2 * | 3/2021 | Sun | G01R 31/3646 |
| 2005/0134230 | A1 | 6/2005 | Sato et al. | |
| 2009/0220825 | A1 | 9/2009 | Nakashima et al. | |
| 2016/0118821 | A1 | 4/2016 | Takeda et al. | |
| 2018/0109124 | A1 | 4/2018 | Kim | |
| 2019/0109471 | A1 | 4/2019 | Lee et al. | |
| 2019/0277916 | A1 | 9/2019 | Sun et al. | |
| 2020/0036219 | A1 | 1/2020 | Yoon et al. | |

FOREIGN PATENT DOCUMENTS

| | | | | |
|---|---|---|---|---|
| JP | 2008-224265 | A | 9/2008 | |
| JP | 2010-259125 | A | 11/2010 | |
| JP | 2011-83147 | A | 4/2011 | |
| JP | 2019-32987 | A | 2/2019 | |
| JP | WO2020/012284 | A1 | 1/2020 | |
| JP | 2021-140963 | A | 9/2021 | |
| KR | 10-2006-0036584 | A | 5/2006 | |
| KR | 10-2009-0006919 | A | 1/2008 | |
| KR | 10-1384847 | B1 | 4/2014 | |
| KR | 10-2014-0116599 | A | 10/2014 | |
| KR | 10-2016-0047382 | A | 5/2016 | |
| KR | 10-2018-0037814 | A | 4/2018 | |
| KR | 10-2018-0043032 | A | 4/2018 | |
| KR | 10-2019-0023265 | A | 3/2019 | |
| KR | 10-2107731 | B1 | 5/2020 | |
| KR | 102210716 | B1 * | 2/2021 | H02J 7/82 |
| KR | 10-2021-0033295 | A | 3/2021 | |
| KR | 10-2232116 | B1 | 3/2021 | |

OTHER PUBLICATIONS

Extended European Search Report for European Application No. 22876682.0, dated Oct. 14, 2024.

* cited by examiner

BATTERY PROTECTION METHODS AND SYSTEMS

CROSS REFERENCE TO RELATED APPLICATIONS

This application is the National Phase of PCT International Application No. PCT/KR2022/012788, filed on Aug. 26, 2022, which claims priority under 35 U.S.C. 119(a) to Patent Application Nos. 10-2021-0130200, filed in Republic of Korea on Sep. 30, 2021 and 10-2022-0093894, filed in Republic of Korea on Jul. 28, 2022, all of which are hereby expressly incorporated by reference into the present application.

TECHNICAL FIELD

The present invention relates to a battery protection method and system, and more specifically, to a method and system for protecting a battery by preventing a simple battery operation failure and a safety issue in advance by implementing an additional algorithm for the release of the protection operation (reuse of the battery) after the generation of the battery protection operation.

BACKGROUND ART

Batteries are widely used in various fields ranging from small electronic devices such as smart phones, laptops, and tablet PCs to electric vehicles and energy storage systems (ESS).

However, while such a battery has efficiency and convenience that can be used in various fields, it has a risk of ignition when overheated due to a characteristic of high energy density. In particular, as the battery market itself is increasingly anxious as battery ignition accidents have rapidly increased, securing the improved safety of the battery is mentioned as an important task.

As a technology to secure the safety of the battery, a battery protection circuit that protects the battery from overcharge, over discharge, over current, and short circuit is used. Generally, when abnormal charge/discharge, short, or over temperature is detected other than the set value, the battery protection circuit generates a corresponding protection operation to take an abnormality measures, and then releases the protection operation when the battery state satisfies a preset release condition to enable a normal operation of the battery.

On the other hand, the battery condition is actually normal, but due to abnormal noise generated when the battery communicates with an external system or is combined with the system, there are frequent cases in which the protection operation is activated or the setting value is changed, which is received as a malfunction.

However, in the state that the conventional protective operation such as overcharge, over discharge, short circuit, overheat is detected, when the preset release condition is satisfied, the method of canceling the protection operation to switch the battery to the normal mode is difficult to protect the battery from simple battery operation failure.

These prior arts are presented in the following patent documents.

(Patent Document 1) JP 2010-259125 A
(Patent Document 2) KR 10-2021-0033295 A

DISCLOSURE OF THE INVENTION

Technical Problem

An object of the present invention is to solve the above problems, and to provide a method and system for securing battery safety by supplementing the reuse condition for a simple battery operation failure and reinforcing the protection operation for a safety issue.

Another object of the present invention is to provide a method and system capable of securing battery safety by preventing overuse of a specific battery bank due to voltage imbalance between the battery banks.

Technical Solution

A battery protection method according to an embodiment of the present invention includes: a state data measurement step of measuring state data of the battery at regular intervals; a protection operation generation step of determining whether the state of the battery satisfies a preset protection operation generation condition for each protection operation item of the battery using the state data of the battery measured in the state data measurement step, and generating a battery protection operation for items determined to be satisfied; a protection operation release step of determining whether the protection operation release condition of a preset occurrence item is satisfied by using the state data of the battery measured after the battery protection operation of at least one item has occurred by the protection operation generation step, and releasing the generated battery protection operation when it is satisfied so that the battery operates in a normal operation mode; and an abnormality measures step of dividing the category to which the item of the protection operation that occurred in the protection operation generation step belongs, and taking a predetermined abnormality measure corresponding to the corresponding category when the occurrence state of the battery protection operation meets the abnormality measures satisfaction condition corresponding to the divided category.

In more detail, the abnormality measures step includes: a category classification step of dividing the category of the battery protection operation generated in the protection operation generation step belongs to among first and second categories; an abnormality measures satisfaction determination step of determining whether the occurrence state of the battery protection operation that has occurred satisfies an abnormality measures satisfaction condition corresponding to the classified category after dividing the category to which the item of the protection operation that occurred in the category classification step belongs; and an abnormality measures operation step of taking predetermined abnormality measures corresponding to the corresponding category when it is determined that the abnormality measures satisfaction determination step is satisfied.

Moreover, the abnormality measures satisfaction determination step includes: performing an occurrence number comparison step of comparing whether a number of occurrences of the battery protection operation of the corresponding item up to the current period is equal to or greater than the first reference number when the item of the protection operation that occurs is in the first category, and if the number of occurrences is greater than or equal to the first reference number, determines that the condition for meeting the abnormality measures corresponding to the first category is satisfied; and performing, if the item of the protection operation that occurred above belongs to the second category, an occurrence number comparison step of comparing whether the number of occurrences of the protection operation of the item up to the current period is equal to or greater than the first reference number and a generation continuation check step of checking whether the generation state of the corresponding protection operation lasts more than the reference time, and determining to satisfy the condition for meeting the abnormality measures corresponding to the second category when the number of occurrences is greater than or equal to the first reference number and the corresponding protection operation generation state is a state that lasted more than the reference time.

In addition, the abnormality measures operation step includes: performing a notification alarm providing step of providing a battery state confirmation notification alarm; and a control value initialization step of initializing a battery control value currently set in memory of the battery to an initial battery control value when it is determined that the item of the protection operation that has occurred meets the condition for meeting the abnormality measures corresponding to the first category, and a control value initialization step of initializing the battery control value currently set in the memory to the initial battery control value when it is determined that the item of the protection operation that has occurred satisfies the condition for meeting the abnormality measures corresponding to the second category; and performing a control value initialization step of initializing the battery control value currently set in the memory to the initial battery control value when it is determined that the item of the protection operation that has occurred satisfies the condition for meeting the abnormality measures corresponding to the second category.

Moreover, the battery protection method of claim further includes, after performing the notification alarm providing step and control value initialization step in the abnormality measures operation step, if the protection operation of the same item occurs more than the second reference number, an additional abnormality measures operation step of permanently blocking the operation of the battery.

Furthermore, the first category includes the item of protection operation that has a greater chance of being a safety issue compared to the item of protection operation of the second category.

A battery protection method according to another embodiment of the present invention includes: a state data measurement step of measuring state data of a battery including at least two battery banks at regular intervals; a battery protection operation generation step of comparing whether the voltage of each battery bank being charged meets a preset over voltage protection operation generation condition based on the state data of the battery measured in the state data measurement step to generate an over voltage protection operation for one or more of the battery banks that meet the requirements; a bank voltage difference calculation step of calculating a voltage difference between the one or more battery banks having over voltage protection operation and one of the battery banks having a lowest voltage in the battery protection operation generation step; a notification alarm generation step of comparing whether the voltage difference calculated in the bank voltage difference calculation step is included in a predetermined reference voltage difference range and generating a state confirmation notification alarm for the having over voltage protection operation when included; and a buffer voltage down adjustment step of checking whether the over voltage protection operation continues to occur over a first reference number in the one or more battery banks having over voltage protection operation after the state confirmation notification alarm of the notification alarm generation step occurs, and downwardly adjusting the buffer voltage value currently set for the one or more battery banks having over voltage protection operation by a predetermined reference voltage value or a predetermined ratio (%) of the buffer voltage value currently set in the case of occurrence.

Moreover, the battery protection method further includes, after buffer voltage down adjustment through the buffer voltage down adjustment step, a battery operation permanent shutdown step of checking whether the over voltage protection operation continues to occur over the second reference number in the one or more battery banks having over voltage protection operation and permanently blocking the operation of the battery in case of occurrence.

Here, the predetermined reference voltage difference range is equal to or greater than the first reference voltage difference but less than the second reference voltage difference.

In detail, the first reference voltage difference is a value corresponding to 80% of the second reference voltage difference, wherein the second reference voltage difference is a value corresponding to the cell imbalance protection operation occurrence determination criterion.

A battery protection system according to an embodiment of the present invention includes: a state data measurement unit configured to measure state data of the battery at regular intervals; a battery protection operation generating unit configured to determine whether the battery state meets a preset protection operation generation condition for each protection operation item using the state data of the battery measured by the state data measurement unit and generate battery protection operation of items determined to be satisfied; a battery protection operation release unit configured to determine whether the protection operation release condition of a preset item is satisfied using the measured state data of the battery after the protection operation of at least one item is generated by the battery protection operation generating unit, and release the battery protection operation of the generated item when it is satisfied; an abnormality measures satisfaction condition comparison determination unit configured to divide a category to which the item of battery protection operation generated in the battery protection operation generating unit belongs, and compare and determine whether the occurrence state of the protection operation satisfies an abnormality measures satisfaction condition corresponding to the divided category; and an abnormality measures unit configured to take predetermined abnormality measures corresponding to the divided categories when it is determined that the occurrence state of the battery protection operation meets the abnormality measures satisfaction condition corresponding to the divided category according to a result of the determination of the abnormality measures satisfaction condition comparison determination unit.

In detail, the abnormality measures satisfaction condition comparison determination unit includes: a protection operation item classification unit configured to output a first or second classification signal by classifying whether the item of the protection operation generated in the battery protection operation generating unit belongs to a preset first category or a second category; an occurrence number comparison unit configured to compare whether the number of occurrences of the protection operation is greater than or equal to the first reference number in the corresponding item until the current period, and output a number-satisfaction signal if it is greater the first reference number when any one of the first and second classification signals is output from the protection operation item classification unit; and an occurrence duration comparison unit configured to compare whether the occurrence state of the protection operation of the corresponding item lasts more than a reference time when a second classification signal is output from the protection operation item classification unit, and output a duration satisfaction signal the occurrence state of the protection operation of the corresponding item has a duration that is equal to or greater than the reference time.

Moreover, the abnormality measures unit includes: a state confirmation notification unit configured to provide a battery state confirmation notification alarm when a number-satisfaction signal is output from the occurrence number comparison unit in a state in which a first classification signal is output from the protection operation item classification unit; a control value initialization unit configured to initialize the battery control value currently set in the memory to an initial battery control value when a number-satisfaction signal is output from the occurrence number comparison unit in a state in which the first classification signal is output from the protection operation item classification unit, or when the number-satisfaction signal and the duration satisfaction signal from the occurrence duration comparison unit are output from the occurrence number comparison unit in the state in which the second classification signal is output from the protection operation item classification unit.

Moreover, the occurrence number comparison unit compares whether the number of occurrences of the protection operation of the corresponding item is greater than or equal to the second reference number, and outputs an additional number-satisfaction signal if it is equal to or greater than the second reference number after providing a battery state confirmation notification alarm by the state confirmation notification unit of the abnormality measures unit.

Accordingly, the abnormality measures unit further includes an operation blocking unit configured to permanently block operation of the battery when an additional number-satisfaction signal is output from the occurrence number comparison unit.

Moreover, the first category includes the item of protection operation that has a greater chance of being a safety issue compared to the item of protection operation of the second category.

A battery protection system according to another embodiment of the present invention includes: a state data measurement unit configured to measure state data of a battery including at least two battery banks at regular intervals; a battery protection operation generating unit configured to compare whether the voltage of each battery bank meets a preset over voltage protection operation generation condition based on the state data of the battery measured by the state data measurement unit, and generate an over voltage protection operation in the at least one of the battery banks that meets the preset over voltage protection operation generation condition; an abnormality measures satisfaction condition comparison determination unit configured to compare whether the voltage difference between the over voltage protection operation generating battery bank in which the over voltage protection operation is generated by the battery protection operation generating unit and the battery bank having a lowest voltage compared to the over voltage protection operation generating battery bank is included in a predetermined reference voltage difference range, and determine whether the over voltage protection operation occurrence battery bank satisfies an abnormality measures satisfaction condition when included; and an abnormality measures unit configured to take predetermined abnormality measures corresponding thereto when it is determined that the abnormality measures satisfaction condition comparison determination unit is satisfied.

Moreover, the battery protection system further comprises a battery protection operation release unit that compares whether the voltage of the corresponding battery bank meets a preset protection operation release condition based on the state data of the battery measured after the over voltage protection operation is generated in at least one battery bank by the battery protection operation generating unit, and releases the protection operation generated in the corresponding battery bank when it is satisfied.

Furthermore, the abnormality measures satisfaction condition comparison determination unit includes: a reference voltage difference range comparison unit configured to compare whether the voltage difference between the over voltage protection operation generating battery bank and the battery bank having the lowest voltage compared to the over voltage protection operation generating battery bank is included in a predetermined reference voltage difference range, and output a difference condition satisfaction signal if included; and an occurrence number comparison unit configured to compare whether the number of continuous occurrences of the over voltage protection operation in the over voltage protection operation occurrence battery bank is equal to or greater than the first reference number after the difference condition satisfaction signal is output from the reference voltage difference range comparison unit, and output a number-satisfaction signal if it is greater than or equal to the first reference number.

In addition, the abnormality measures unit includes: a state confirmation notification unit configured to provide a battery state confirmation notification alarm when the difference condition satisfaction signal is output from the reference voltage difference range comparison unit; and a buffer voltage control unit configured to lower the buffer voltage value currently set in the corresponding battery bank by a predetermined reference voltage value when the number-satisfaction signal is output from the occurrence number comparison unit.

Moreover, the occurrence number comparison unit compares whether the number of continuous occurrences of the over voltage protection operation in the corresponding battery bank after the buffer voltage down adjustment of the buffer voltage control unit is the second reference number or more, and outputs an additional number-satisfaction signal if it is equal to greater than the second reference number.

Accordingly, the abnormality measures unit further includes an operation blocking unit that takes additional abnormality measures to permanently block the operation of the battery when an additional number-satisfaction signal is output from the occurrence number comparison unit.

Moreover, the predetermined reference voltage difference range is set to be greater than or equal to the first reference voltage difference but less than the second reference voltage difference.

In detail, the first reference voltage difference is a value corresponding to 80% of the second reference voltage difference, wherein the second reference voltage difference is a value corresponding to the cell imbalance protection operation occurrence determination criterion.

Advantageous Effects

The present invention can improve battery safety by preventing the occurrence of safety issues in advance by supplementing reuse conditions for simple battery operation failures and reinforcing protection operations for safety issues such as ignition and heat generation.

MODE FOR CARRYING OUT THE INVENTION

Figure 1:
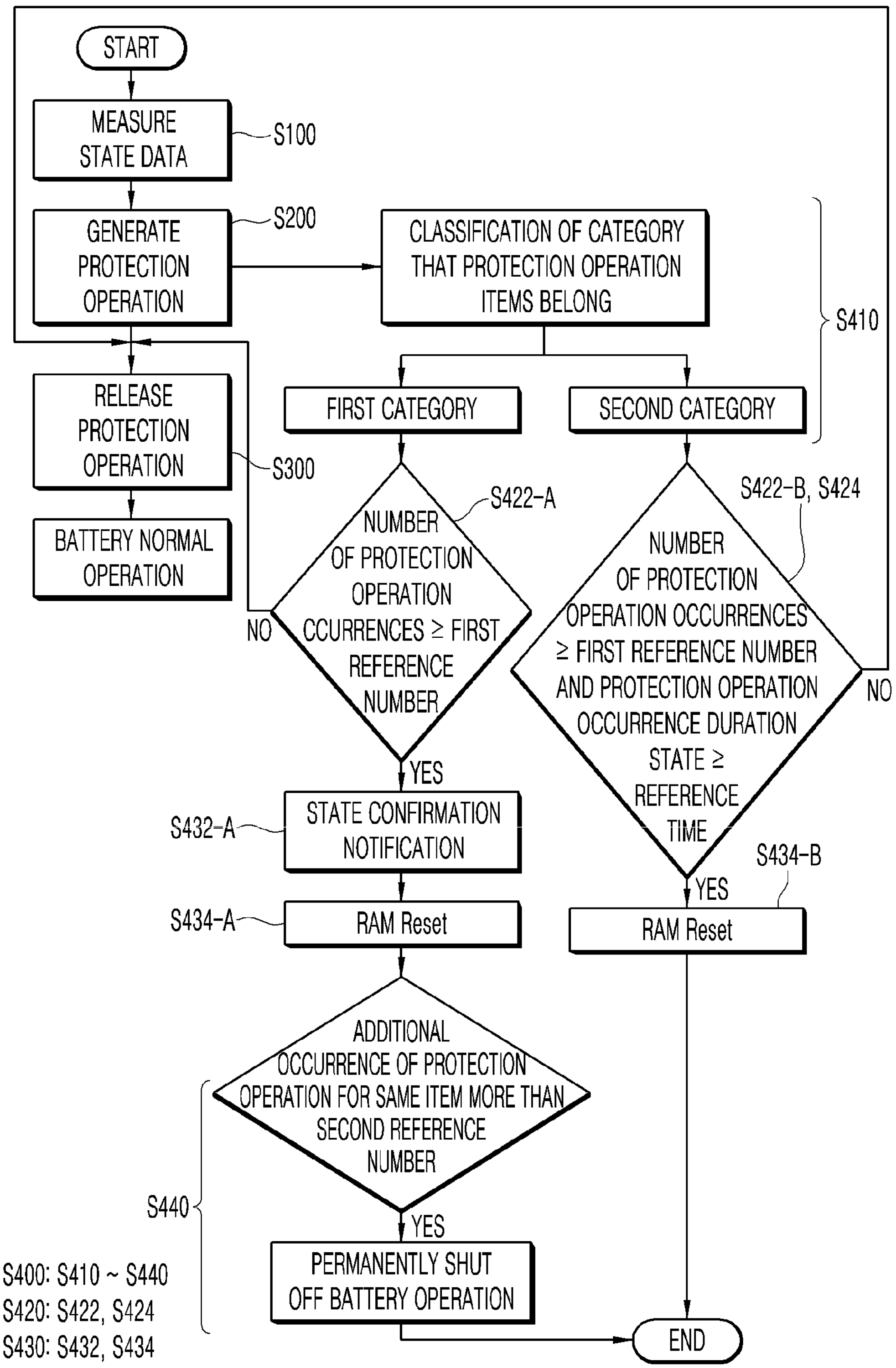
FIG. 1 is a view showing a battery protection method according to Embodiment 1 of the present invention.

Hereinafter, embodiments of the present invention will be described in detail with reference to the accompanying drawings so that those of ordinary skill in the art may easily implement the present invention. However, the present invention may be implemented in various forms and is not limited to the embodiments described herein. In the drawings, parts irrelevant to the description are omitted in order to clearly describe the present invention, and like reference numerals refer to like elements throughout the specification.

Hereinafter, the present invention will be described in detail with reference to the drawings.

1. Terms Used in Present Invention 1.1. Battery Protection Operation Items

The item of battery protection operation means a type of each well-known battery protection operation that operates to protect a battery from abnormal charging/discharging, short circuit, over temperature, and the like.

The item of the battery protection operation includes an Over Voltage Protection (OVP), Under Voltage Protection (UVP), Discharge Over Current Protection (DOCP), Charge Over Current Protection (COCP), Discharge Over Temperature Protection (DOTP), Discharge Under Temperature Protection (DUTP), Charge Over Temperature Protection (COTP), Charge Under Temperature Protection (CUTP), Short Circuit Protection, Cell Imbalance Protection, and FET error Protection.

1.2. First and Second Categories

The present invention sets the items of each battery protection operation described above by dividing items that are likely to be expressed as safety issues, such as ignition and heat, and items that are not, into first and second categories.

The first category is a category to which an item that is likely to be expressed as a safety issue among the battery protection operation items belongs, and includes Over Voltage Protection (OVP), Charge Over Current Protection (COCP), Cell Imbalance Protection, and FET error Protection.

The second category is a category to which an item that is unlikely to be expressed as a safety issue among the battery protection operation items belongs, and includes Under Voltage Protection (UVP), Discharge Over Current Protection (DOCP), Discharge Over Temperature Protection (DOTP), Discharge Under Temperature Protection (DUTP), Over Charge These include Charge Over Temperature Protection (COTP), Charge Under Temperature Protection (CUTP), and Short Circuit Protection.

1.3. State Data

The battery state data measured in the present invention may include a voltage of each battery cell, a current, a current of a Shunt Resistor, a voltage across the Shunt Resistor, and a temperature value of the Thermistor.

To determine whether or not the battery protection operation of each item occurs/cancels using such state data, a known technique for each protection operation item is used.

For example, in the case of over voltage/low voltage/over current/low current protection operation, whether the measured voltage/current value is equal to or greater than/below each set reference value may be compared to determine whether it occurs. In the case of FET error protection operation, it can be determined that the current value of the shunt resistor is higher than the set reference value even though the charge/discharge FET is turned off. In the case of over temperature/low temperature protection operation, it is possible to determine whether or not the occurrence of the measured thermistor temperature value is higher/lower than each set reference value. In the case of a short circuit protection operation, it can be determined whether or not it occurs using the voltage value across the shunt resistor and the shunt resistor value.

2. Battery Protection Method According to Present Invention

The method for protecting a battery according to the present invention includes two embodiments.

Embodiment 1: Battery Protection Operation Method to Protect Battery by Abnormality Measures According to Item FIG. 1 is a view showing a battery protection method according to Embodiment 1 of the present invention.

Referring to FIG. 1, Embodiment 1 divides the items of each battery protection operation into two categories according to the possibility of safety issues, and takes abnormality measures depending on whether the protection operation occurrence state meets the conditions corresponding to the above-divided categories to protect the battery in a way that compensates for simple battery operation failure due to actual normality or noise and prevents the occurrence of safety issues in advance.

2.1. State Data Measurement Operation S100

The state data measurement step S100 is a step of measuring state data of the battery at regular intervals.

2.2. Protection Operation Generation Step S200

A protection operation generation step S200 is a step of using the state data of the battery measured in the state data measurement step S100 to determine whether the state of the battery meets a preset battery protection operation generation condition for each protection operation item of each battery, and generating the battery protection operation of the items determined to be satisfied.

2.3. Protection Operation Release Step S300

A protection operation release step S300 is a step of determining whether the battery protection operation release condition of the previously generated item is satisfied using state data of the battery measured after the battery protection operation of at least one item has occurred by the protection operation generation step S200, and releasing the generated battery protection operation when satisfied, so that the battery operates in a normal operation mode. A method of determining whether the generated protection operation is released also uses a known technique.

2.4. Abnormality Measures Step S400

An abnormality measures step S400 is a step of dividing the category to which the item of the battery protection operation generated in the protection operation generation step S200 belongs, and determining whether the occurrence state of the battery protection operation meets the abnormality measures satisfaction condition corresponding to the divided category to take predetermined abnormality measures corresponding to the corresponding category when it is determined that the abnormality measures satisfaction condition is satisfied.

This abnormality measures step S400 is configured to include the following detailed steps.

2.4.1. Category Classification Step S410

First, a category classification step S410 of classifying which category of the first category and the second category belongs to the item of the battery protection operation generated in the protection operation generation step S200 is performed.

Here, as previously described, the first category is a category to which the item of protection operation, which is likely to be expressed as an issue about safety, such as fire, ignition, etc., belongs, and the second category is a category to which protection operation items, which are less likely to be expressed as safety issues such as fire and ignition, belong.

2.4.2. Abnormality Measures Satisfaction Determination Step S420

An abnormality measures satisfaction determination step S420 is a step of classifying the category to which the item of the battery protection operation that occurred in the category classification step S410 belongs, and then, determining whether the generation state of the generated battery protection operation satisfies the abnormality measures satisfaction condition corresponding to the divided category.

Specifically, when the item of the battery protection operation that has occurred belongs to the first category, an occurrence number comparison step S422-A is performed to compare whether the accumulated number of battery protection operations of the corresponding item up to the current period is equal to or greater than the first reference number. If the accumulated number of occurrences is equal to or greater than the first reference number, it is determined that the condition for satisfying the abnormality measures corresponding to the first category is satisfied.

When the accumulated number of occurrences, that is, the number of times the battery protection operation of the same item occurs, does not reach the first reference number, no additional abnormality measures are taken to enable normal battery operation depending on whether the battery protection operation release condition of the relevant item is satisfied.

On the other hand, if the item of the generated battery protection operation belongs to the second category, an occurrence number comparison step S422-B is performed to compare whether the accumulated number of battery protection operations of the corresponding item up to the current period is equal to or greater than the first reference number and a generation continuation check step S424 is performed to check whether the state in which the battery protection operation has occurred continues for more than a reference time. If the accumulated number of occurrences, that is, the number of occurrences of the battery protection operation of the same item is equal to or greater than the first reference number, and there is a state in which the protection operation occurrence state continues for more than the reference time, It is determined that the condition for meeting the abnormality measures corresponding to the second category is satisfied.

Here, the first reference number may be set to, for example, three, and the reference time may be set, for example, to 10 minutes.

2.4.3. Abnormality Measures Operation Step S430

The abnormality measures operation step S430 is a step of taking predetermined abnormality measures corresponding to the corresponding category when it is determined that the abnormality measures satisfaction determination step S420 is satisfied. In the present embodiment, the predetermined abnormality measures may include a state confirmation notification alarm generation measures, and a battery control value initialization measures, which will be described later, and further include abnormality measures of blocking battery operation.

Specifically, when it is determined that the item of the battery protection operation that has occurred satisfies the condition for meeting the abnormality measures corresponding to the first category, a notification alarm providing step S432-A of providing a state confirmation notification alarm notifying the battery state check and a control value initialization step S434-A of initializing the battery control value set in the current memory (e.g., RAM) to the initial battery control value are performed.

On the other hand, when it is determined that the item of the battery protection operation that has occurred satisfies the condition for meeting the abnormality measures corresponding to the second category, a control value initialization step S434-B of initializing the battery control value currently set in the memory (RAM) to the initial battery control value is performed.

Here, the initialization of the memory setting value may be implemented in the form of, for example, reading a ROM value and writing it to a RAM.

2.4.4. Additional Abnormality Measures Operation Step S440

An additional abnormality measures operation step S440 is a step of taking the abnormality measures corresponding to the first category in the abnormality measures operation step S430, and then, taking additional abnormality measures to permanently block the operation of the battery when the battery protection operation of the same item occurs more than the second reference number.

In the case of battery protection operation of items belonging to the first category, although taking the first abnormality measures to initialize the memory and provide a battery state confirmation notification alert through the abnormality measures operation step S430, since the battery protection operation of the same item is continuously repeated, this will cause battery deterioration, in order to block this in advance, if the battery protection operation additionally occurs the second reference number, the battery operation is permanently blocked.

Here, the second reference number may be set to, for example, two.

Embodiment 2: Method of Protecting Battery with Abnormality Measures Before Occurrence of Cell Imbalance Protection Operation FIG. 2 is a view showing a battery protection method according to Embodiment 2 of the present invention.

Figure 2:
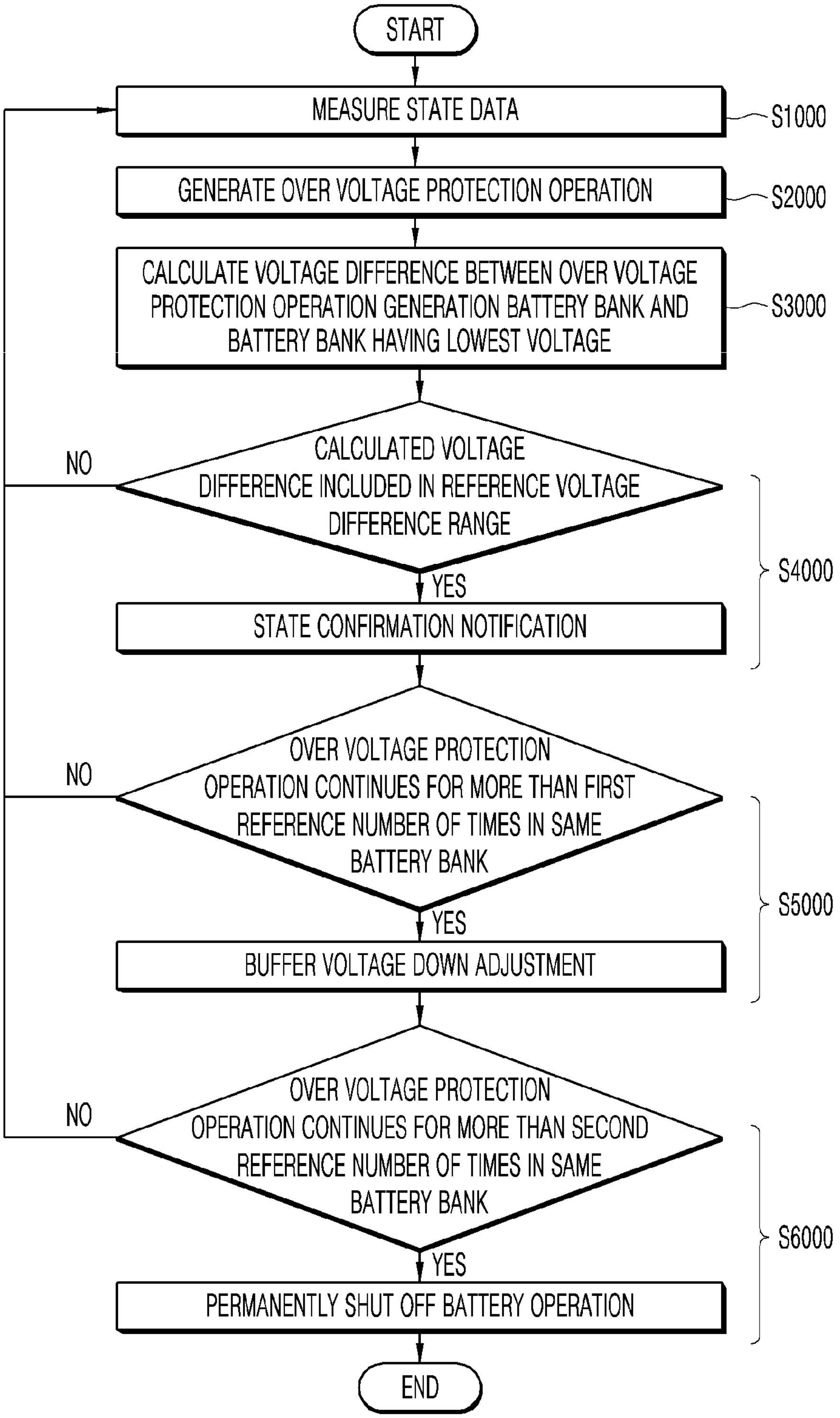
FIG. 2 is a view showing a battery protection method according to Embodiment 2 of the present invention.

Referring to FIG. 2, in Embodiment 2, when an over voltage protection operation occurs in a specific battery bank, if the voltage difference between the battery bank and the lowest voltage battery bank meets the standard condition, as abnormality measures, it takes measures to prevent overcharging of the battery bank by providing a notification for checking the battery state first and lowering the buffer voltage, and if the over voltage protection operation continues to occur in the corresponding battery bank even after that, by taking secondary measures to permanently block battery operation, it protects the battery in a way that prevents the occurrence of a safety issue in advance.

2.1. State Data Measurement Operation S1000

The state data measurement step S1000 is a step of measuring state data of the battery at regular intervals.

2.2. Battery Protection Operation Generation Step S2000

The battery protection operation generation step S2000 generates an over voltage protection operation for a satisfying battery bank by comparing whether the voltage of each battery bank being charged meets a preset over voltage protection operation occurrence condition based on the state data of the battery measured in the state data measurement step S1000.

2.3. Bank Voltage Difference Calculation Step S3000

The bank voltage difference calculation step S3000 is a step of calculating a voltage difference between an over voltage protection operation generation battery bank in which the over voltage protection operation occurs in the battery protection operation generation step S2000 and a battery bank having the lowest voltage compared to the over voltage protection operation generating battery bank.

2.4. Notification Alarm Generation Step S4000

The notification alarm generation step S4000 is a step of comparing whether the voltage difference calculated in the bank voltage difference calculation step S3000 is included in a predetermined reference voltage difference range, and if included, generating a state confirmation notification alarm for the over voltage protection operation generating battery bank.

Here, the predetermined reference voltage difference range is set to be greater than the first reference voltage difference but less than the second reference voltage difference.

In this case, the first reference voltage difference may correspond to a predetermined range of the second reference voltage difference, for example, may be a value corresponding to 80%. The second reference voltage difference may be a value corresponding to a condition for determining occurrence of a cell imbalance protection operation among items of battery protection operation.

In other words, when the voltage difference between the over voltage protection operation occurrence battery bank and the lowest voltage battery bank is greater than a predetermined range of the cell imbalance protection operation level, in one embodiment, when 80% or more, a state confirmation notification alarm is generated.

The reason for setting in this way is to prevent in advance from progressing to safety issues such as rapid deterioration and heat generation and ignition due to overuse of a specific battery bank due to an unbalanced state even before the voltage difference state between the battery banks reaches the cell unbalance protection operation condition.

2.5. Buffer Voltage Down Adjustment Step S5000

A buffer voltage down adjustment step S5000 is a step of checking whether the over voltage protection operation continues for more than the first reference number in the same battery bank after the state confirmation notification alarm occurs in the notification alarm generation step S4000, and in case of occurrence, lowering the buffer voltage value currently set for the corresponding battery bank by a predetermined reference voltage value. The down-regulation of the buffer voltage may employ a method of down-regulating the preset buffer voltage by a predetermined reference voltage, for example, by 0.5 V, or down-regulating by a predetermined percentage.

2.6. Battery Operation Permanent Shutdown Step S6000

The battery operation permanent shutdown step S6000 checks whether the over voltage protection operation additionally occurs more than a second reference number in the same battery bank after adjusting the buffer voltage down through the buffer voltage down adjustment step S6000, and permanently shutting off the operation of the battery if it occurs.

Although taking the first abnormality measures to prevent overcharging of the over voltage protection operation occurring battery bank through the notification alarm generation step S4000 and the buffer voltage down adjustment step S5000, in case of continuous over voltage protection operation in the same battery bank, because of concerns about safety issues, additional abnormality measures are taken to permanently block battery operation even before cell imbalance protection operation occurs and this is to protect the battery by preventing the occurrence of a safety issue in advance.

3. Battery Protection System According to Present Invention

The battery protection system according to the present invention includes two embodiments.

Embodiment 1: Method of Protecting Battery with Abnormality Measures According to Battery Protection Operation Item FIG. 3 is a diagram illustrating a configuration of a battery protection system according to Embodiment 1 of the present invention.

Figure 3:
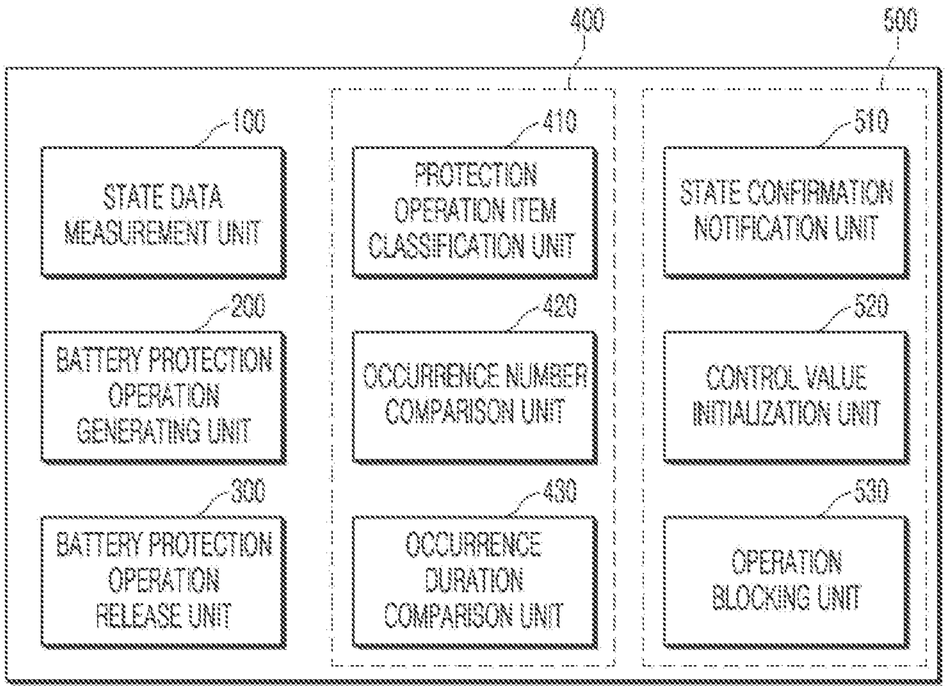
FIG. 3 is a view showing a battery protection system according to Embodiment 1 of the present invention.

Referring to FIG. 3, the battery protection system according to Embodiment 1 divides the items of each battery protection operation into two categories according to the possibility of a safety issue, takes the above-described abnormality measures according to whether the protection operation occurrence state meets the conditions corresponding to the divided categories, and protects the battery in such a way that it compensates for a simple battery operation failure due to actual normality or noise and prevents the occurrence of a safety issue in advance.

3.1. Battery (not Shown)

The battery of the present invention is configured to include at least two or more battery banks configured to include a plurality of battery cells.

3.2. State Data Measurement Unit 100

The state data measurement unit 100 is configured to measure state data of the battery at regular intervals.

As described above, the battery state data measured in the present invention includes the voltage of each battery cell, the current, the current of the shunt resistor, the voltage across the shunt resistor, and the temperature value of the Thermistor and a method of measuring each of them uses a known technique.

3.3. Battery Protection Operation Generating Unit 200

The battery protection operation generating unit 200 determines whether the battery state meets a preset battery protection operation generation condition for each protection operation item of each battery by using the state data of the battery measured by the state data measurement unit 100 to generate the battery protection operation of the item determined to be satisfied.

The generation of the battery protection operation may be implemented, for example, in the form of outputting a protection operation generation signal indicating the occurrence of the battery protection operation of the corresponding item.

3.4. Battery Protection Operation Release Unit 300

The battery protection operation release unit 300 determines whether the battery protection operation release condition of the preset item is satisfied using the state data of the battery measured by the state data measurement unit 100 after the battery protection operation of at least one item is generated by the battery protection operation generating unit 200 and if it is satisfied, cancels the battery protection operation of the generated item.

The release of the battery protection operation may be implemented, for example, in the form of outputting a protection operation release signal indicating the release of the battery protection operation of the corresponding item.

3.5. Abnormality Measures Satisfaction Condition Comparison Determination Unit 400

The abnormality measures satisfaction condition comparison determination unit 400 divides the category to which the item of battery protection operation generated in the battery protection operation generating unit 200 belongs, and compares and determines whether the occurrence state of the battery protection operation satisfies the abnormality measures satisfaction condition corresponding to the divided category.

The abnormality measures satisfaction condition comparison determination unit 400 may be configured to include the following detailed configuration.

3.5.1. Protection Operation Item Classification Unit 410

The protection operation item classification unit 410 performs a task of dividing/classifying whether the item of the battery protection operation generated in the battery protection operation generating unit 200 belongs to a preset first category or a second category. The item classification of the protection operation can be divided by receiving the above-described protection operation generation signal for each item.

When the item of the generated battery protection operation belongs to the first category, for example, a first classification signal indicating this may be output.

On the other hand, when the item of the generated battery protection operation belongs to the second category, for example, a second classification signal indicating this may be output.

3.5.2. Occurrence Number Comparison Unit 420

If the item of the battery protection operation generated by the protection operation item classification unit 410 is classified as belonging to the first category or the second category, the occurrence number comparison unit 420 compares whether or not the accumulated number of battery protection operations of the same item until the current period is equal to or greater than the first reference number, and outputs a frequency satisfaction signal when it is equal to or greater than the first reference number.

More specifically, when any one of the first and second classification signals is output from the protection operation item classification unit 410, by comparing whether the accumulated number of times the battery protection operation corresponding to the signal has occurred up to the current cycle is equal to or greater than the first reference number, if it is equal to or greater than the first reference number, it is possible to output a number-satisfaction signal indicating this.

Here, the first reference number may be set, for example, to three times.

Meanwhile, after providing a battery state confirmation notification alarm of the abnormality measures unit 500 to be described later, by comparing whether the number of times the battery protection operation of the item corresponding to the battery state confirmation notification alarm occurs in the battery protection operation generating unit 200 is greater than or equal to a second reference number, the occurrence number comparison unit 420 outputs an additional number-satisfaction signal if it is equal to or greater than the second reference number.

Here, the second reference number may be set to, for example, two.

3.5.3. Occurrence Duration Comparison Unit 430

When the item of the generated battery protection operation is classified as belonging to the second category by the protection operation item classification unit 410, the occurrence duration comparison unit 430 checks whether the occurrence state of the corresponding battery protection operation lasts more than a reference time, and outputs a duration satisfaction signal if it is equal to or greater than the reference time.

In other words, when the second classification signal is output from the protection operation item classification unit 410, it is possible to compare whether the occurrence state of the corresponding battery protection operation lasts more than a reference time, and if it is equal to or greater than the reference time, output a duration satisfaction signal indicating this.

The time for which the battery protection operation generation state is maintained, for example, can be implemented in a form obtained through the time/time point at which the protection operation release signal from the battery protection operation release unit 300 for the generated battery protection operation is output.

Here, the reference time may be set to, for example, 10 minutes.

3.6. Abnormality Measures Unit 500

As a result of the determination of the abnormality measures satisfaction condition comparison determination unit 400, when it is determined that the occurrence state of the battery protection operation satisfies the condition for satisfying the abnormality measures corresponding to the divided category, the abnormality measures unit 500 takes predetermined abnormality measures corresponding to the divided categories.

The abnormality measures unit 500 may be configured to include the following detailed configuration.

3.6.1. State Confirmation Notification Unit 510

When a number-satisfaction signal is output from the occurrence number comparison unit 420 in a state in which the first classification signal is output from the protection operation item classification unit 410, the state confirmation notification unit 510 provides, as abnormality measures, a battery state confirmation notification alarm.

In other words, when the battery protection operation of the same item belonging to the first category that is likely to be expressed as a safety (ignition, heat) problem occurs more than the first reference number (e.g., 3 times), this is to provide the user with a battery state confirmation notification alarm.

3.6.2. Control Value Initialization Unit 520

When a number-satisfaction signal is output from the occurrence number comparison unit 420 in a state in which the first classification signal is output from the protection operation item classification unit 410, or when a number-satisfaction signal from the occurrence number comparison unit 420 and a duration satisfaction signal from the occurrence duration comparison unit 430 are output in a state in which the second classification signal is output from the protection operation item classification unit 410, the control value initialization unit 520 initializes the battery control value changed and set in the current memory (RAM) to the initial battery control value as abnormality measures.

In other words, when the number of occurrences of battery protection operation of the same item belonging to the first category that is likely to be expressed as a safety (ignition, heat) problem is more than the first reference number (e.g., 3 times), or when the number of occurrences of battery protection operation of the item belonging to the second category that is likely to be expressed as a safety (ignition, heat) problem is the first reference number (e.g., 3 times) or more and the battery protection operation continues for more than the reference time in the occurrence state, this is to restore the battery to the initial normal mode by initializing the current battery control value to the initial battery control value.

3.6.3. Operation Blocking Unit 530

The operation blocking unit 530 is configured to take additional abnormality measures to permanently block the operation of the battery when an additional number-satisfaction signal is output from the occurrence number comparison unit 420.

In the case of battery protection operation of items belonging to the first category, although the state confirmation notification unit 510 and the control value initialization unit 520 provide a battery state confirmation notification alarm and take first abnormality measures to initialize the memory, since the battery protection operation of the same item is continuously repeated, it will cause battery deterioration, and in order to block this in advance, if the battery protection operation of the same item occurs an additional second reference number, the battery operation is permanently cut off.

Embodiment 2: Method of Protecting Battery as Abnormality Measures Before Occurrence of Cell Imbalance Protection Operation FIG. 4 is a diagram illustrating a configuration of a battery protection system according to Embodiment 2 of the present invention.

Figure 4:
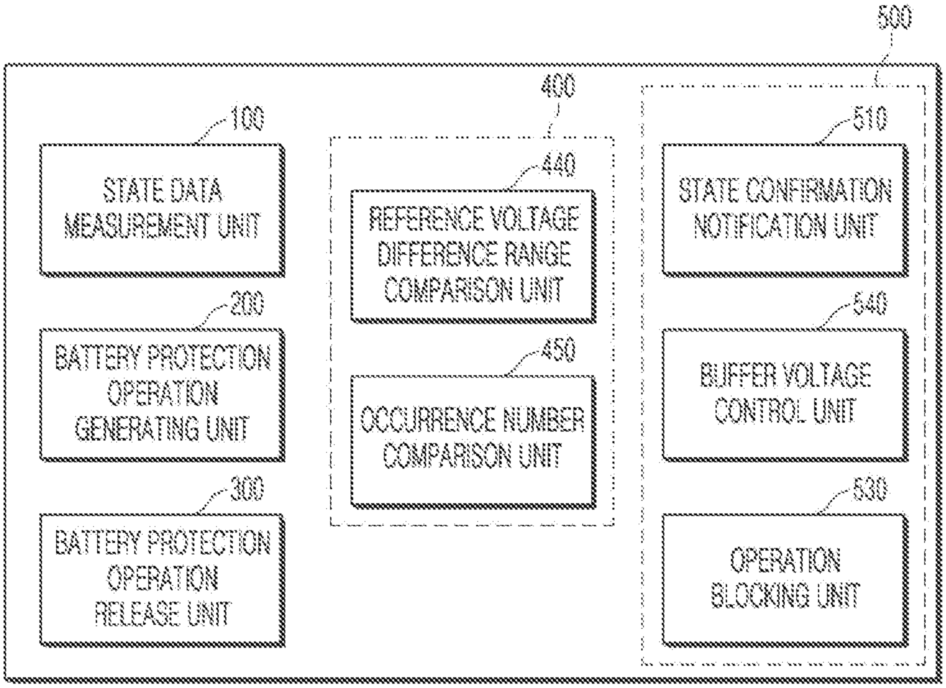
FIG. 4 is a view showing a battery protection system according to Embodiment 2 of the present invention.

Referring to FIG. 4, in the battery protection system according to Embodiment 2, when an over voltage protection operation occurs in a specific battery bank, if the voltage difference between the battery bank and the lowest voltage battery bank meets the standard condition, it takes measures to prevent overcharging of the battery bank by providing a notification for checking the battery state first and lowering the buffer voltage, and if the over voltage protection operation continues to occur in the corresponding battery bank even after that, by taking secondary measures to permanently block battery operation, it protects the battery in a way that prevents the occurrence of a safety issue in advance. In the case of the system according to Embodiment 2, some components of the system according to Embodiment 1 described above are the same, but may be implemented by additionally including a configuration to be described later or by changing the functions of some components. Therefore, with respect to the system according to Embodiment 2, the description of the same configuration or function as in Embodiment 1 will be omitted, and description will be made focusing on the added or different configuration/function.

3.3. Battery Protection Operation Generating Unit 200

The battery protection operation generating unit 200 compares whether the voltage of each battery bank meets a preset over voltage protection operation generation condition based on the state data of the battery measured by the state data measurement unit 100 described above to generate an over voltage protection operation on the battery bank that meets the requirements. For example, an over voltage protection operation generation signal may be output. Here, the over voltage protection operation generation signal may include an identification number for identifying the corresponding battery bank.

A battery bank corresponding to the occurrence of the over voltage protection operation may be referred to and described as a battery bank corresponding to the occurrence of the over voltage protection operation hereinafter.

3.4. Battery Protection Operation Release Unit 300

The battery protection operation release unit 300 compares whether the voltage of the corresponding battery bank meets a preset over voltage protection operation release condition based on the state data of the battery measured after the over voltage protection operation is generated in at least one or more battery banks by the battery protection operation generating unit 200 and if it is satisfied, releases the protection operation generated in the corresponding battery bank. For example, an over voltage protection operation release signal may be output.

3.5. Abnormality Measures Satisfaction Condition Comparison Determination Unit 400

The abnormality measures satisfaction condition comparison determination unit 400 determines whether the voltage difference between the over voltage protection operation generating battery bank in which the over voltage protection operation is generated by the battery protection operation generating unit 300 and the battery bank having the lowest voltage compared to the over voltage protection operation generating battery bank corresponds to a predetermined reference voltage difference range, and if the voltage difference corresponds to a predetermined reference voltage difference range, compares and determines whether the over voltage protection operation generating battery bank satisfies an abnormal condition satisfaction condition.

3.5.1. Reference Voltage Difference Range Comparison Unit 440

The reference voltage difference range comparison unit 440 may be configured to include a voltage difference calculation unit (not shown) for calculating a voltage difference between the over voltage protection operation generating battery bank and the battery bank having the lowest voltage compared to the over voltage protection operation generating battery bank. In addition, it is possible to compare whether the voltage difference calculated by the voltage difference calculation unit (not shown) is included in a predetermined reference voltage difference range, and if included, output a difference condition satisfaction signal indicating this.

Here, the predetermined reference voltage difference range is set to be greater than the first reference voltage difference but less than the second reference voltage difference.

In this case, the first reference voltage difference may be set to a value corresponding to 80% of the second reference voltage difference.

In other words, the voltage difference between the over voltage protection operation occurrence battery bank and the lowest voltage battery bank exceeds a predetermined range of the cell imbalance protection operation level, in an embodiment, when it is 80% or more, a difference condition satisfaction signal is output.

3.5.2. Occurrence Number Comparison Unit 450

After the difference condition satisfaction signal is output from the reference voltage difference range comparison unit 440, by comparing whether the number of continuous occurrences of the over voltage protection operation in the corresponding over voltage protection operation is greater than or equal to the first reference number, the occurrence number comparison unit 450 may output a number-satisfaction signal when it is equal to or greater than the first reference number.

Here, the first reference number may be set, for example, to three times.

On the other hand, the occurrence number comparison unit 450 compares whether the number of continuous occurrences of the over voltage protection operation in the corresponding battery bank is equal to or greater than the second reference number after the buffer voltage down adjustment of the buffer voltage control unit 540 to be described later, and outputs an additional number-satisfaction signal if it is equal to or greater than the second reference number.

Here, the second reference number may be set to, for example, two.

3.6. Abnormality Measures Unit 500

When it is determined to be satisfied according to the determination result of the abnormality measures satisfaction condition comparison determination unit 400, the abnormality measures unit 500 is configured to take predetermined abnormality measures corresponding thereto.

3.6.1. State Confirmation Notification Unit 510

When the difference condition satisfaction signal indicating that the voltage difference between the over voltage protection operation occurrence battery bank and the battery bank having the lowest voltage compared to the over voltage protection operation occurrence battery bank is a state corresponding to the reference voltage difference range is output from the reference voltage difference range comparison unit 440, the state confirmation notification unit 510 provides a battery state confirmation notification alarm as abnormality measures.

3.6.2. Buffer Voltage Control Unit 540

When the number-satisfaction signal indicating that the over voltage protection operation has occurred more than the first reference number of times in the battery bank, the over voltage protection operation corresponding to the difference condition satisfaction signal is output from the occurrence number comparison unit 450, the buffer voltage control unit 540 lowers the buffer voltage value currently set in the corresponding battery bank by a predetermined reference voltage value as an abnormality measure.

During buffer voltage down adjustment, for example, a buffer voltage down signal can be output.

3.6.3. Operation Blocking Unit 530

When an additional number-satisfaction signal indicating that the over voltage protection operation has additionally occurred a second reference number of times is output to the battery bank in which the buffer voltage is down-regulated from the occurrence number comparison unit 450, the operation blocking unit 530 is configured to take additional abnormality measures to permanently block the operation of the battery.

Although the state confirmation notification unit 510 and the buffer voltage control unit 540 take first abnormality measures to prevent overcharging of the battery bank from the occurrence of an over voltage protection operation, in case of continuous over voltage protection operation in the same battery bank, because of concerns about safety issues, additional abnormality measures are taken to permanently block battery operation even before cell imbalance protection operation occurs and this is to protect the battery by preventing the occurrence of a safety issue in advance.

The configurations according to Embodiment 1 or Embodiment 2 as described above may be implemented in a Main IC that controls battery operation.

On the other hand, although the technical idea of the present invention has been specifically described according to the above embodiment, it should be noted that the above embodiments are for the purpose of explanation and not limitation. In addition, those skilled in the art in the technical field of the present invention will be able to understand that various embodiments are possible within the scope of the spirit of the present invention.

The invention claimed is:

1. A battery protection method comprising:

a state data measurement step of measuring state data of a battery at regular intervals;

a protection operation generation step of determining whether the state of the battery satisfies a preset protection operation generation condition for each protection operation item of the battery using the state data of the battery measured in the state data measurement step, and generating a battery protection operation for items determined to be satisfied;

a protection operation release step of determining whether the protection operation release condition of a preset occurrence item is satisfied by using the state data of the battery measured after the battery protection operation of at least one item has occurred by the protection operation generation step, and releasing the generated battery protection operation when it is satisfied so that the battery operates in a normal operation mode; and an abnormality measures step of dividing a category to which the item of the protection operation that occurred in the protection operation generation step belongs, and taking a predetermined abnormality measure corresponding to the corresponding category when the occurrence state of the battery protection operation meets the abnormality measures satisfaction condition corresponding to the divided category.

2. The battery protection method of claim 1, wherein the abnormality measures step comprises:

a category classification step of dividing the category of the battery protection operation generated in the protection operation generation step belongs to among first and second categories;

an abnormality measures satisfaction determination step of determining whether the occurrence state of the battery protection operation that has occurred satisfies an abnormality measures satisfaction condition corresponding to the classified category after dividing the category to which the item of the protection operation that occurred in the category classification step belongs; and an abnormality measures operation step of taking predetermined abnormality measures corresponding to the corresponding category when it is determined that the abnormality measures satisfaction determination step is satisfied.

3. The battery protection method of claim 2, wherein the abnormality measures satisfaction determination step comprises:

performing an occurrence number comparison step of comparing whether a number of occurrences of the battery protection operation of the corresponding item up to the current period is equal to or greater than the first reference number when the item of the protection operation that occurs is in the first category, and if the number of occurrences is greater than or equal to the first reference number, determines that the condition for meeting the abnormality measures corresponding to the first category is satisfied; and performing, if the item of the protection operation that occurred above belongs to the second category, an occurrence number comparison step of comparing whether the number of occurrences of the protection operation of the item up to the current period is equal to or greater than the first reference number and a generation continuation check step of checking whether the generation state of the corresponding protection operation lasts more than the reference time, and determining to satisfy the condition for meeting the abnormality measures corresponding to the second category when the number of occurrences is greater than or equal to the first reference number and the corresponding protection operation generation state is a state that lasted more than the reference time.

4. The battery protection method of claim 3, wherein the abnormality measures operation step comprises:

performing a notification alarm providing step of providing a battery state confirmation notification alarm; and a control value initialization step of initializing a battery control value currently set in memory of the battery to an initial battery control value when it is determined that the item of the protection operation that has occurred meets the condition for meeting the abnormality measures corresponding to the first category, and a control value initialization step of initializing the battery control value currently set in the memory to the initial battery control value when it is determined that the item of the protection operation that has occurred satisfies the condition for meeting the abnormality measures corresponding to the second category; and performing a control value initialization step of initializing the battery control value currently set in the memory to the initial battery control value when it is determined that the item of the protection operation that has occurred satisfies the condition for meeting the abnormality measures corresponding to the second category.

5. The battery protection method of claim 4, further comprising, after performing the notification alarm providing step and control value initialization step in the abnormality measures operation step, if the protection operation of the same occurs more than the second reference number, an additional abnormality measures operation step of permanently blocking the operation of the battery.

6. The battery protection method of claim 2, wherein the first category includes the item of protection operation that has a greater chance of being a safety issue compared to the item of protection operation of the second category.

7. A battery protection method comprising:

a state data measurement step of measuring state data of a battery including at least two battery banks at regular intervals;

a battery protection operation generation step of comparing whether the voltage of each battery bank being charged meets a preset over voltage protection operation generation condition based on the state data of the battery measured in the state data measurement step to generate an over voltage protection operation for one or more of the battery banks that meet the requirements;

a bank voltage difference calculation step of calculating a voltage difference between the one or more battery banks having over voltage protection operation and one of the battery banks having a lowest voltage in the battery protection operation generation step;

a notification alarm generation step of comparing whether the voltage difference calculated in the bank voltage difference calculation step is included in a predetermined reference voltage difference range and generating a state confirmation notification alarm for the one or more battery banks having over voltage protection operation when included; and a buffer voltage down adjustment step of checking whether the over voltage protection operation continues to occur over a first reference number in the one or more battery banks having over voltage protection operation after the state confirmation notification alarm of the notification alarm generation step occurs, and downwardly adjusting the buffer voltage value currently set for the one or more battery banks having over voltage protection operation by a predetermined reference voltage value or a predetermined ratio (%) of the buffer voltage value currently set in the case of occurrence.

8. The battery protection method of claim 7, further comprising, after buffer voltage down adjustment through the buffer voltage down adjustment step, a battery operation permanent shutdown step of checking whether the over voltage protection operation continues to occur over the second reference number in the one or more battery banks having over voltage protection operation and permanently blocking the operation of the battery in case of occurrence.

9. The battery protection method of claim 7, wherein the predetermined reference voltage difference range is equal to or greater than the first reference voltage difference but less than the second reference voltage difference.

10. The battery protection method of claim 9, wherein the first reference voltage difference is a value corresponding to 80% of the second reference voltage difference, wherein the second reference voltage difference is a value corresponding to the cell imbalance protection operation occurrence determination criterion.

11. A battery protection system comprising:

a state data measurement unit configured to measure state data of a battery at regular intervals;

a battery protection operation generating unit configured to determine whether the battery state meets a preset protection operation generation condition for each protection operation item using the state data of the battery measured by the state data measurement unit and generate battery protection operation of items determined to be satisfied;

a battery protection operation release unit configured to determine whether the protection operation release condition of a preset item is satisfied using the measured state data of the battery after the protection operation of at least one item is generated by the battery protection operation generating unit, and release the battery protection operation of the generated item when it is satisfied;

an abnormality measures satisfaction condition comparison determination unit configured to divide a category to which the item of battery protection operation generated in the battery protection operation generating unit belongs, and compare and determine whether the occurrence state of the protection operation satisfies an abnormality measures satisfaction condition corresponding to the divided category; and an abnormality measures unit configured to take predetermined abnormality measures corresponding to the divided categories when it is determined that the occurrence state of the battery protection operation meets the abnormality measures satisfaction condition corresponding to the divided category according to a result of the determination of the abnormality measures satisfaction condition comparison determination unit.

12. The battery protection system of claim 11, wherein the abnormality measures satisfaction condition comparison determination unit comprises:

a protection operation item classification unit configured to output a first or second classification signal by classifying whether the item of the protection operation generated in the battery protection operation generating unit belongs to a preset first category or a second category;

an occurrence number comparison unit configured to compare whether the number of occurrences of the protection operation is greater than or equal to the first reference number in the corresponding item until the current period, and output a number-satisfaction signal if it is greater the first reference number when any one of the first and second classification signals is output from the protection operation item classification unit; and an occurrence duration comparison unit configured to compare whether the occurrence state of the protection operation of the corresponding item lasts more than a reference time when a second classification signal is output from the protection operation item classification unit, and output a duration satisfaction signal the occurrence state of the protection operation of the corresponding item has a duration that is equal to or greater than the reference time.

13. The battery protection system of claim 12, wherein the abnormality measures unit comprises:

a state confirmation notification unit configured to provide a battery state confirmation notification alarm when a number-satisfaction signal is output from the occurrence number comparison unit in a state in which a first classification signal is output from the protection operation item classification unit;

a control value initialization unit configured to initialize the battery control value currently set in the memory to an initial battery control value when a number-satisfaction signal is output from the occurrence number comparison unit in a state in which the first classification signal is output from the protection operation item classification unit, or when the number-satisfaction signal and the duration satisfaction signal from the occurrence duration comparison unit are output from the occurrence number comparison unit in the state in which the second classification signal is output from the protection operation item classification unit.

14. The battery protection system of claim 13, wherein the occurrence number comparison unit compares whether the number of occurrences of the protection operation of the corresponding item is greater than or equal to the second reference number, and outputs an additional number-satisfaction signal if it is equal to or greater than the second reference number after providing a battery state confirmation notification alarm by the state confirmation notification unit of the abnormality measures unit.

15. The battery protection system of claim 14, wherein the abnormality measures unit further comprises an operation blocking unit configured to permanently block operation of the battery when an additional number-satisfaction signal is output from the occurrence number comparison unit.

16. The battery protection system of claim 12, wherein the first category includes the item of protection operation that has a greater chance of being a safety issue compared to the item of protection operation of the second category.

17. A battery protection system comprising:

a state data measurement unit configured to measure state data of a battery including at least two battery banks at regular intervals;

a battery protection operation generating unit configured to compare whether the voltage of each battery bank meets a preset over voltage protection operation generation condition based on the state data of the battery measured by the state data measurement unit, and generate an over voltage protection operation in at least one of the battery banks that meets the preset over voltage protection operation generation condition;

an abnormality measures satisfaction condition comparison determination unit configured to compare whether the voltage difference between the over voltage protection operation generating battery bank in which the over voltage protection operation is generated by the battery protection operation generating unit and the battery bank having a lowest voltage compared to the over voltage protection operation generating battery bank is included in a predetermined reference voltage difference range, and determine whether the over voltage protection operation occurrence battery bank satisfies an abnormality measures satisfaction condition when included; and an abnormality measures unit configured to take predetermined abnormality measures corresponding thereto when it is determined that the abnormality measures satisfaction condition comparison determination unit is satisfied.

18. The battery protection system of claim 17, further comprising a battery protection operation release unit that compares whether the voltage of the corresponding battery bank meets a preset protection operation release condition based on the state data of the battery measured after the over voltage protection operation is generated in at least one battery bank by the battery protection operation generating unit, and releases the protection operation generated in the corresponding battery bank when it is satisfied.

19. The battery protection system of claim 17, wherein the abnormality measures satisfaction condition comparison determination unit comprises:

a reference voltage difference range comparison unit configured to compare whether the voltage difference between the over voltage protection operation generating battery bank and the battery bank having the lowest voltage compared to the over voltage protection operation generating battery bank is included in a predetermined reference voltage difference range, and output a difference condition satisfaction signal if included; and an occurrence number comparison unit configured to compare whether the number of continuous occurrences of the over voltage protection operation in the over voltage protection operation occurrence battery bank is equal to or greater than the first reference number after the difference condition satisfaction signal is output from the reference voltage difference range comparison unit, and output a number-satisfaction signal if it is greater than or equal to the first reference number.

20. The battery protection system of claim 19, wherein the abnormality measures unit comprises:

a state confirmation notification unit configured to provide a battery state confirmation notification alarm when the difference condition satisfaction signal is output from the reference voltage difference range comparison unit; and a buffer voltage control unit configured to lower the buffer voltage value currently set in the corresponding battery bank by a predetermined reference voltage value when the number-satisfaction signal is output from the occurrence number comparison unit.

21. The battery protection system of claim 20, wherein the occurrence number comparison unit compares whether the number of continuous occurrences of the over voltage protection operation in the corresponding battery bank after the buffer voltage down adjustment of the buffer voltage control unit is the second reference number or more, and outputs an additional number-satisfaction signal if it is equal to greater than the second reference number.

22. The battery protection system of claim 21, wherein the abnormality measures unit further comprises an operation blocking unit that takes additional abnormality measures to permanently block the operation of the battery when an additional number-satisfaction signal is output from the occurrence number comparison unit.

23. The battery protection system of claim 19, wherein the predetermined reference voltage difference range is set to be greater than or equal to the first reference voltage difference but less than the second reference voltage difference.

24. The battery protection system of claim 23, wherein the first reference voltage difference is a value corresponding to 80% of the second reference voltage difference, wherein the second reference voltage difference is a value corresponding to the cell imbalance protection operation occurrence determination criterion.

* * * * *